April 21, 1925.  1,534,939
J. W. FUGE
MILK SAMPLE OBTAINING MEANS FOR USE IN VACUUM MILKING MACHINERY
Filed Oct. 20, 1923
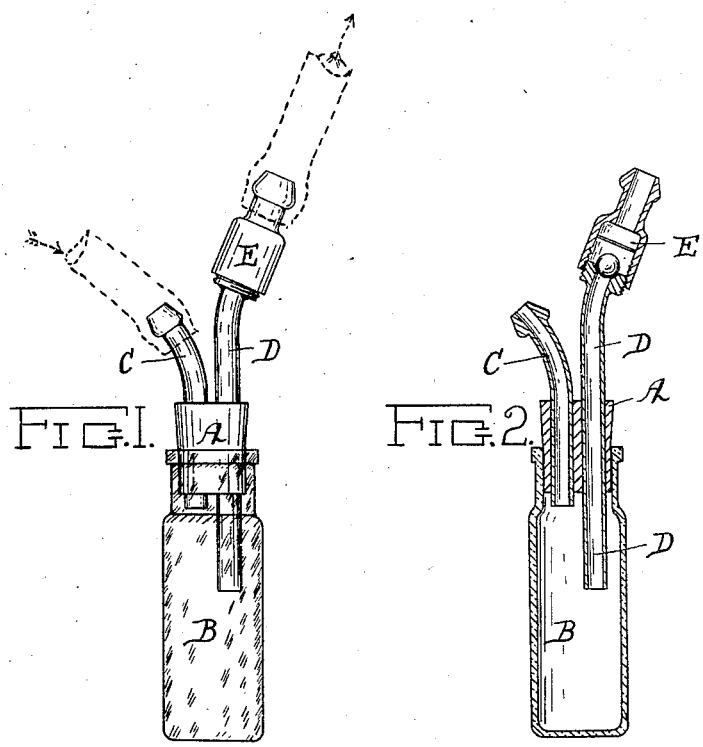
Inventor:
James Wilfred Fuge
By
Attorney Patented Apr. 21, 1925.

1,534,939

UNITED STATES PATENT OFFICE.

JAMES WILFRED FUGE, OF FEATHERSTON, NEW ZEALAND, ASSIGNOR TO THE FUGE NEW WAY MILKING MACHINE AND TESTER COMPANY LIMITED, OF FEATHERSTON, NEW ZEALAND.

MILK-SAMPLE-OBTAINING MEANS FOR USE IN VACUUM MILKING MACHINERY.

Application filed October 20, 1923. Serial No. 669,852.

*To all whom it may concern:*

Be it known that I, JAMES WILFRED FUGE, subject of the King of Great Britain, residing at Kahautara Road, Featherston, in the Dominion of New Zealand, have invented new and useful Improvements in Milk-Sample-Obtaining Means for Use in Vacuum Milking Machinery, of which the following is a specification.

This invention has been devised with the object of providing means for use with vacuum cow milking machinery whereby a small quantity of the milk given by each cow during her milking, may be automatically separated off from the main quantity for use as a sample in the carrying out of the ordinary testing operations employed in determining the quality of the milk. The invention is serviceable in connection with a system of herd testing by which each cow of the herd has her milk tested at stated periods and a sample from each milking is required to provide the testing sample.

The means devised are designed for use in combination with any of the known forms of machines in which the milk is drawn away from the cow through a pipe conduit under the influence of a milking vacuum and whether such machine is of the well known bucket type in which the conduit leads to an enclosed bucket, or of the releaser type in which the conduit leads to a pipe main that in turn leads to a releaser apparatus by which the milk is released from such main.

The invention will be found of particular service when used in conjunction with machines in which the milk is led from the conduit through appliances by means of which its measure, or weight, is ascertained, so that facilities are thus afforded for determining the amount of milk given by each cow, as well as for removing a test sample. Consequently both quantitative and qualitative tests may thus be provided for.

The means comprising the invention are adapted to be interposed within the said conduit pipe and are so constructed that the whole of the milk passes through a sample holding bottle of suitable nature, and then when the milking has finished, leaves a small quantity remaining in such bottle. The appliance is also so formed that the amount thus left may be regulated in its quantity.

These means are illustrated in the accompanying drawings, in which:—

Figure 1 is an elevation of the device, and
Figure 2 is a vertical section thereof.

In carrying out the invention, a rubber or like plug or stopper A is provided and this is made adaptable for insertion into the neck of an ordinary sample holding bottle B, one of which will be provided for each cow to be milked. Such bottles are preferably made of clear glass so that the contents may be seen, but must be of such strength as to withstand the outside atmospheric pressure when the inside is under the action of the milking vacuum.

Combined with the plug or stopper A are two tubes C and D passing down through it in air sealed apertures. One of these tubes C is made short and is disposed in the plug so that its lower end just emerges from the bottom of the plug. The top end of this tube C is made so that it may connect with one divided end of the usual flexible pipe connection (shown by the dotted lines in Figure 1) extending from the teat cups of the machine to the vacuum source, such end being that connected to the teat cups.

The other tube D is made of greater length so that it may be lowered or raised within the bottle to position its bottom end at any desired level therein. Its upper end is formed to provide for its connection to the other divided end of the flexible pipe connection beforementioned, i. e. that connected to the vacuum source.

When therefore the plug A is inserted into the neck of a sample bottle B, to hermetically seal it, and the tubes C and D are connected up with the milk conduit flexible pipe at a suitable point in its length such that the bottle is suspended vertically thereon, the milking will be carried on through the bottle, the milk passing into it through the tube C and out again through the tube D. If however, the bottom end of the tube D is arranged at a suitable distance from the bottom of the bottle a remnant will remain in the bottle after the milking has finished, owing to the fact that the suction is not sufficiently strong to draw the milk up across the gap thus provided. The quantity of the remnant thus allowed to remain may be readily adjusted by altering the level of the tube D in the bottle to any required height therein, and in correspondence with the height of the gap through which the suction will not act.

The bottle will be removed, with its sample, when the milking has finished and a fresh bottle pushed up over the plug to put the milking means in milking condition again, and ready to receive the sample of the next cow's milk.

The outlet end of the tube D is fitted with an ordinary non-return valve E to prevent any back flow of milk from the conduit, into the sample bottle.

The insertion of the sample bottle into the milk flow line will, in addition to the purpose described, provide a sight glass, if the bottle is made of clear glass, so that the milk may be seen and any trouble or fault checked.

I claim:—

In a vacuum operated liquid measuring and dispensing installation, the combination of a transparent bottle for holding a sample of the liquid; a plug stopper hermetically sealing the mouth thereof and having two parallel vertical openings formed through it; a pair of tubes extending through said openings, one tube being fixed and emerging just beneath the stopper, and the other tube being movable endwise to vary the distance between its lower end and the bottom of the bottle; a pipe section, through which the liquid is supplied, connected to the outer end of the fixed tube to discharge the liquid into the bottle; and a second pipe section connected to the outer end of the movable tube and leading therefrom to a source of vacuum to withdraw the liquid from the bottle; whereby the adjusted position of the said lower end of the movable tube with relation to the bottle bottom will determine the point at which the vacuum is automatically interrupted and the quantity of liquid left in the bottle.

In testimony whereof, I affix my signature.

JAMES WILFRED FUGE.